Nov. 2, 1926.

J. B. BURTON 1,605,425

STOP MECHANISM

Filed May 7, 1926

INVENTOR
Jesse B. Burton
BY
ATTORNEY

Nov. 2, 1926.　　　　　　　　　　　　　　　　1,605,425
J. B. BURTON
STOP MECHANISM
Filed May 7, 1926　　　　2 Sheets-Sheet 2

INVENTOR
Jesse B. Burton
BY
ATTORNEY

Patented Nov. 2, 1926.

1,605,425

UNITED STATES PATENT OFFICE.

JESSE B. BURTON, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

STOP MECHANISM.

Application filed May 7, 1926. Serial No. 107,370.

This invention relates to a new and improved stop mechanism, that is particularly adapted for use as a part of a make and break connection mechanism between a driving wheel, and a shaft or the like, such mechanism being commonly used on power presses and similar machines.

It is the object of this invention, among other things to provide in a device of this character means whereby the friction mechanism is first applied and thereafter the member uniting the driving wheel and shaft is withdrawn so as to bring the shaft to a full stop, and also when starting the rotation of the shaft the friction mechanism is first released and then the uniting member is positioned so as to join the shaft and driving wheel.

These objects, I accomplish by means of such structure and relative arrangement of parts as will fully appear from the following specification and claims.

Referring to the drawings, in which like numerals of reference designate like parts in the several figures.

Figure 1:
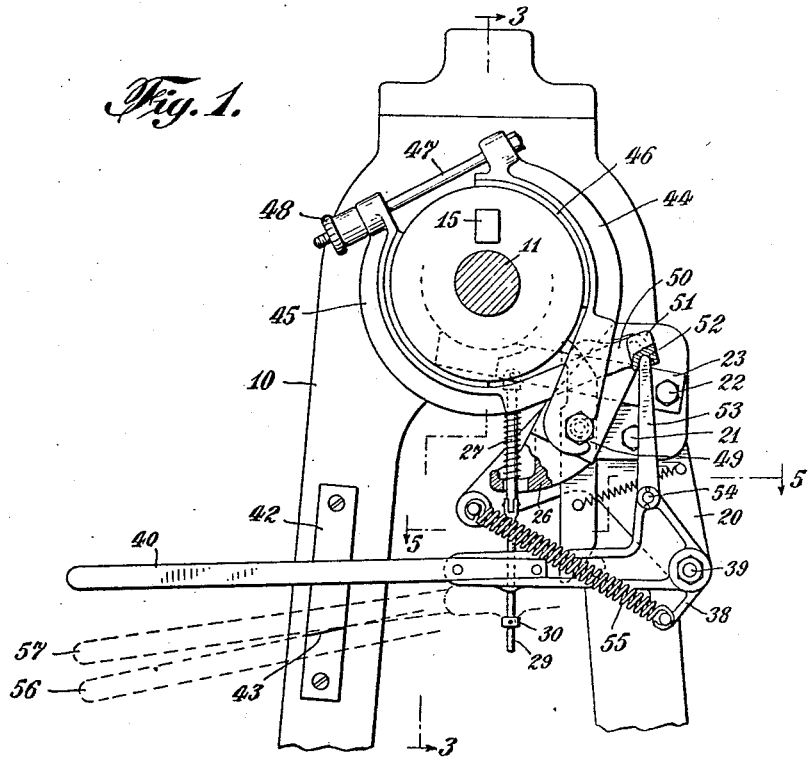
Figure 1 is a side elevation of a portion of a machine having my new and improved stop mechanism attached thereto, the parts being in the positions occupied by them when the clutch lever is in the path of the clutch key or dog.

My improved stop mechanism is herein illustrated as applied to a power press, although, of course, not limited thereto.

It is desirable with machines operating at a high speed that the moving parts come to a full stop in a predetermined position and begin to move again, and attain their maximum speed as quickly as possible without friction upon the parts or shock to the mechanism. Heretofore it has been the practice in stopping the press to withdraw the clutch key or dog and then apply the friction mechanism; and in starting the press to form the connection between the driving wheel and the shaft before releasing the friction. The result of this practice is that, in stopping the press no attempt is made to apply friction to the rotating shaft until after the key is withdrawn from the driving wheel, hence there is liable to be considerable rotation of the shaft after the withdrawal of the key. In starting the press the clutch key having formed a positive connection between the shaft and wheel before the friction is released, there is a drag upon the shaft during the first portion of the rotation thereof and until this friction is in fact released. In both instances the operations are faulty, for some classes of machines in that the shaft will not stop quick enough after being released from the driving wheel and will not acquire its full speed or momentum quick enough after connection with the driving wheel, owing to the unreleased pressure of the friction mechanism.

In this invention I have provided a stop mechanism wherein the friction is applied before the key is withdrawn, which brings the shaft to a quick stop and it is released before the connection is made between the shaft and driving wheel so that the starting of the shaft is almost instantaneous and without the drag of the friction thereon.

In the press herein shown, 10 designates the body, 11 the crank shaft rotatable therein, and having a collar 12, within which is an annular groove 13, and an axial slot 14 containing the clutch key or dog, 15. This key has a recess 16 in the outer edge thereof, and under the tension of a spring 17 is moved normally in a direction parallel to the axis of the shaft and away from the body 10.

Rotatably mounted upon the shaft 11 is the driving wheel 18, held against endwise movement in one direction by a collar 19. All of the parts above described are well known in the art and constitute no part of this present invention.

Fixed to the body by the bolts 21 or the like is a bracket 20 and on the bolt 22 therein is journaled the clutch lever 23, of the usual form and structure. The outer end of this clutch lever is movable within the annular groove 13 toward and away from the shaft 11, the outer pointed end thereof when in its up position being in the path of the recess 16 in the key 15.

Figure 3:
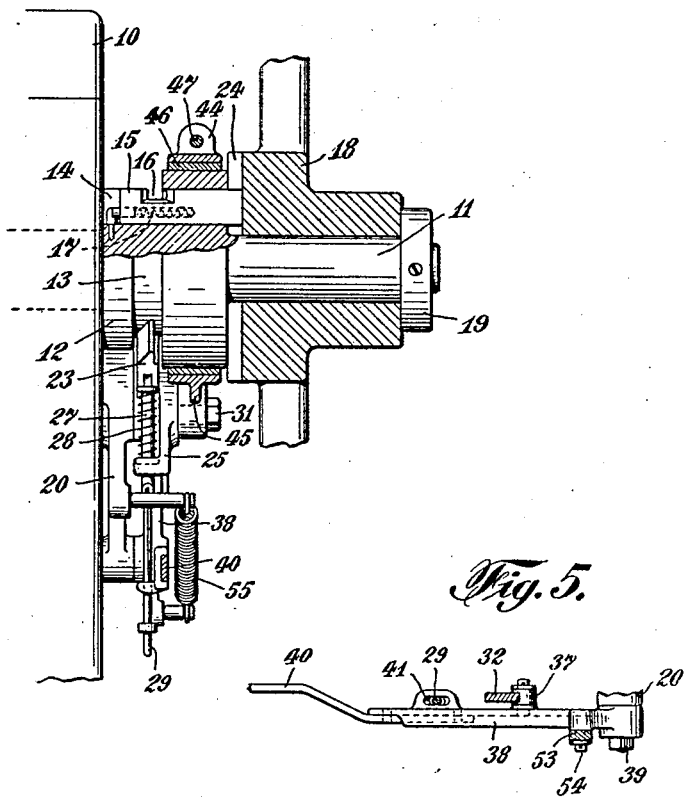
Figure 3 is a front elevation of the parts substantially as shown in Figure 1, the parts in section being taken generally upon the plane indicated by line 3—3 in Figure 1.
Figure 5:
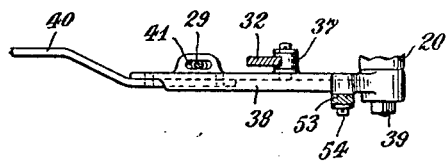
Figure 5 is also a fragmentary plan view, the parts in section being taken generally on line 5—5 of Figure 1.
Figure 4:
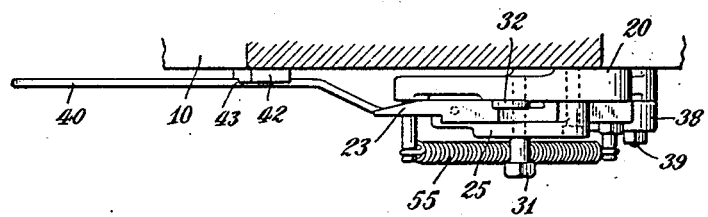
Figure 4 is a fragmentary plan view, the part in section being taken generally on line 4—4 of Figure 2.

As shown in Figure 3, the outer end of the key 15 is within the groove 24, in the inner face of the hub of the driving wheel 18, making a positive connection between the crank shaft and driving wheel which now rotate as a unit.

When the clutch lever 23 is in the position substantially as shown in Figures 1 and 3, the outer end of the clutch lever is in the path of the recess 16 in the key 15. As the lever engages the key the latter is moved axially within the collar 12 and the outer end thereof withdrawn from the groove 24, thus severing the connection between the driving wheel and shaft and the driving wheel continues its movement about the shaft without imparting movement thereto.

Secured to the bracket 20 is a plate 25, having a foot portion 26, between the arms of which passes the rod 27 that is pivotally connected to the clutch lever 23, and surrounded in part by the coil spring 28, which exerts its tension so as to apply a constant and upward pressure to the clutch lever 23.

Connected with the lower end of the rod 27 is an extension rod 29, upon which is adjustably secured a collar 30.

Figure 2:
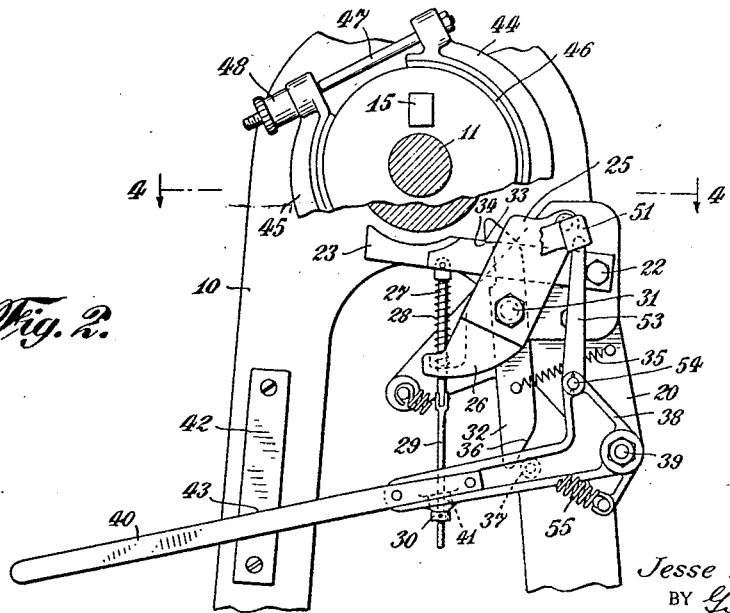
Figure 2 is a similar view, some of the parts being broken away for clearness and illustrating the clutch lever out of the path of the clutch key.

Pivotally mounted upon the stud 31, which in part secures the plate 25, is the locking plate 32, having a recess in its inner face, near the upper end with an end wall 33, which in one of its positions engages a notch 34 in the clutch lever 23 and holds it in its down position, substantially as shown in Figure 2. This locking plate is thus held by the tension of a spring 35. The angular face 36 upon this locking plate is in the path of the roll 37, upon the rock arm 38 that is pivotally mounted upon the stud 39 fixed in the bracket 20. A handle 40 forms an extension of this rock arm and is shown herein as a separate element but it may be integral with the rock arm if desired.

The extension rod 29 extends through a slot 41 in the rock arm and the collar 30 is positioned thereunder.

In starting and stopping the press the operator manipulates the rock arm 38 through the handle. In Figure 1 the handle 40 is illustrated in its extreme up position with the inner face adjacent to the catch plate 42 fixed on the body 10, at which time the clutch lever 23 is in the path of the key 15.

In Figure 2, the handle 40 is illustrated in down position and the upper edge thereof is held in such position by engagement with the shoulder 43 upon the catch plate 42. While being moved to this position the collar 30 is engaged by the rock arm 38 and the clutch lever is pulled to its down position through the rods 29 and 27 against the tension of the spring 28, and out of the path of the key 15. At this time there is a positive connection between the driving wheel 18 and crank shaft 11 and rotation is imparted to the other thereby. When in its down position the clutch lever is locked against accidental upward movement by the locking plate 32 under tension of the spring 35. While the arm 40 moves from its down to its up position, the roll 37 upon the rock arm 38 contacts with the angular face of the locking plate 32, causing the same to move upon its pivot mounting 31 and disengages the wall 33 from the clutch 34, thus releasing the clutch lever from its locking mechanism and permitting the same to move upwardly under the tension of spring 28.

The friction mechanism comprises arms 44 and 45, each of which has a leather pad 46 or the like on its inner wall and are connected at their outer ends by the bolt 47, having the hand nut 48 threaded thereon, whereby wear of the parts is taken up, as well as providing means for varying the extent of friction upon the collar 12. The stud 31, which lies within the notch 49 in the lower end of the arm 44 holds this arm against movement in one direction. Friction arm 45 is formed with an extension 50 that terminates in a lug 51 having a pocket 52 in one face thereof. Into this pocket projects the upper end of a toggle link 53, the lower end of which is pivotally connected to the rock arm 38 by the stud 54. In Figure 1 the upper end of the link 53 is in its extreme up position and the rock arm 38 and associated parts are held in this position by the spring 55. When so positioned the friction arms 44 and 45 apply friction to the collar 12. This it will be noted is at a time prior to the engagement of the key 15 with the clutch lever 23. When the handle 40 is in its down position, the upper end of the link 53 is also in its down position and therefore applies no tension to the friction arms, which are thereby released from their frictional engagement with the collar 12. In Figure 1 the full lines illustrate the extreme up position of the handle 40, the broken lines 56, its extreme down position, and the broken lines 57, an intermediate position, that is, when the rock arm 38 first engages the collar 30. During the movement of the handle 40 between the positions 57 and 56 the clutch lever 23 is being withdrawn as above described. During this movement the link 53 is pulled downwardly, and relieves the pressure upon the arm 45 and through it, upon the arm 44. The friction of these arms upon the collar 12 is thus released before the clutch lever 23 is moved out of the path of the key 15. Thus, it will be seen that the brake mechanism is applied just before the key is withdrawn from the driving wheel and is taken off just before the key is released by the clutch lever, to form a positive connection between the plate and shaft.

I have shown the clutch plate 42 as being attached to the body 10, but it may be formed integral therewith within my invention, and in these and other ways, the details of my invention may be modified within the spirit and scope of the appended claims.

What I claim is,

1. In a make and break mechanism of the character described having two operative parts; a movable member for forming a connection between the parts; a mechanism for applying friction to one of the parts; and means for operating the friction mechanism whereby it will apply friction to one of the parts prior to such movement of the movable member as will break the connection therebetween.

2. In combination with a shaft; a wheel rotatably mounted thereon; a movable member for forming an operative connection between the shaft and wheel; a friction mechanism to control the movement of the shaft; means for actuating the movable member to form a make and break connection between the shaft and wheel; and means for actuating the friction mechanism whereby it will apply friction to retard the movement of the shaft prior to the initiation of the movement of the movable member to break the connection between the shaft and wheel.

3. In a make and break mechanism of the character described having two operative parts; a movable member for forming a connection between the parts; a mechanism for applying friction to one of the parts; and means for operating the friction mechanism whereby it will apply friction to one of the parts prior to such movement of the movable member as will break the connection therebetween, and release such friction prior to the movement of such movable member to form a connection between the parts.

4. In a make and break mechanism of the character described having two operative parts; a movable member for forming a connection between the parts; a mechanism for applying friction to one of the parts; and means for operating the friction mechanism to apply friction to one of the parts prior to such movement of the movable member as will break the connection therebetween and release such friction prior to the movement of the movable member to form an operative connection between such parts.

5. In a make and break mechanism of the character described having two operative parts; a movable member for forming a connection between the parts; a lever for actuating the movable member in one direction; mechanism for applying friction to one of the parts; means for actuating the lever in one direction to move the same out of the path of the movable member; and independent means between the lever actuating means and the friction mechanism whereby movement thereof will in part control such friction mechanism.

6. In a make and break mechanism of the character described having two operative parts; a movable member for forming a connection between the parts; a lever for actuating the movable member in one direction; a mechanism for applying friction to one of the parts; means, comprising in part a rock member, for actuating the lever in one direction to move the same out of the path of the movable member; a connection between the rock member and the friction mechanism whereby movement of the rock member in one direction will apply pressure to the friction mechanism.

7. In a make and break mechanism of the character described having two operative parts; a movable member for forming a connection between the parts; a lever for actuating the movable member in one direction; a mechanism for applying friction to one of the parts; a rock member; yielding means for moving the rock member in one direction; means for actuating the lever in one direction to move the same out of the path of the movable member; a part, connected with the lever actuating means, in the path of the rock member, whereby the rock member during a portion of its movement will in part move the lever actuating means.

8. In a make and break mechanism of the character described having two operative parts; a movable member for forming a connection between the parts; means for moving said member in one direction; a mechanism for applying friction to one of the parts; a rock member; a link between the rock member and friction mechanism; a part connected with the said moving means that is engaged by and actuated by the rock member, during a portion of its movement.

9. In a make and break mechanism of the character described having two operative parts; a movable member for forming a connection between the parts; means for actuating the movable member in one direction; a mechanism for applying friction to one of the parts, comprising a plurality of arms, a rock member, and a link between the rock member and one of the arms; and a part connected with the means for actuating the movable member, which is engaged by and moved with the rock member during a portion of its movement in one direction.

10. In a make and break mechanism of the character described having two operative parts; a movable member for forming a connection between the parts; a lever for actuating the movable member in one direction; a rock member; and means, that is in part actuated through said rock member, for holding the lever against movement out of the path of the movable member comprising in part a plate, a portion of which is in the path of movement of the rock member and is engaged and moved thereby when the rock member is moving in one direction.

11. In a make and break mechanism of the character described having two operative parts; a movable member for forming a connection between the parts; mechanism for applying friction to one of the parts; means for positively operating the movable member in one direction; a member for actuating both the last mentioned mechanism and means, having a slip joint connection with the means for operating the movable member.

12. In a make and break mechanism of the character described having two operative parts; a movable member for forming a connection between the parts; lever means for moving the movable member in one direction; mechanism for applying friction to one of the parts; a rock member; a positive connection between the rock member and the friction mechanism; and a slip joint connection between said rock member and the lever means.

13. In a make and break mechanism of the character described having two operative parts; a movable member for forming a connection between the parts; a clutch lever which in one of its positions is in the path of the movable member; a rock member; a part connected with the clutch lever; a member on said part in the path of the rock member; a link connection between the rock member and the friction mechanism; and yielding means for moving the rock member in one direction.

14. In combination with a rotary member; a shaft member; a movable key mounted in one of the members and adapted to engage the other member to form a rigid connection therebetween; means for positively moving the key in one direction; friction mechanism adapted to engage one of said members, comprising in part two arms, one end of one of which is held in a fixed position, and the end of the other arm is free; and means, as toggle mechanism, for applying pressure to the end of the free arm, and through it friction to the part with which the arms are engaged.

15. In combination with a rotary member; a shaft member; a movable key mounted in one of the members and adapted to engage the other member to form a rigid connection therebetween; means for positively moving the key in one direction; friction mechanism adapted to engage one of the members, comprising in part two arms, one end of one of which is held in a fixed position, and the end of the other arm is free; and means, as toggle mechanism, for applying pressure to the end of the last mentioned arm, and through it friction to the parts with which the arms are engaged; and yielding means for moving the toggle mechanism in one direction.

16. In combination with a rotary member; a shaft member; a movable key mounted in one of the members and adapted to engage the other member to form a rigid connection therebetween; means for positively moving the key in one direction; friction mechanism adapted to engage one of the members, comprising in part two arms, one end of one of which is held in a fixed position, and the end of the other arm is free; and means, as toggle mechanism, for applying pressure to the end of the last mentioned arm, and through it friction to the part with which the arms are engaged; yielding means for moving the toggle mechanism in one direction; and means for drawing the clutch lever out of the path of movement of the key during a portion of the operation of the toggle mechanism, the sequence of operations of the toggle mechanism being such as to first actuate the friction mechanism and then the clutch lever, during a single movement of the toggle mechanism in one direction.

17. In combination with a rotary member; a shaft member; a movable key mounted in one of the members and adapted to engage the other member to form a rigid connection therebetween; means for positively moving the key in one direction; friction mechanism adapted to engage one of the members, comprising in part two arms, one end of one of which is held in a fixed position, and the end of the other arm is free; and means, as toggle mechanism, for applying pressure to the end of the last mentioned arm, and through it friction to the part with which the arms are engaged; yielding means for moving the toggle mechanism in one direction; and means for drawing the clutch lever out of the path of the movement of the key during a portion of the operation of the toggle mechanism, the sequence of operations of the toggle mechanism being such as to first actuate the friction mechanism and then the clutch lever, during a single movement of the toggle mechanism in one direction, and during the movement of the toggle mechanism in the opposite direction, the friction mechanism is first actuated and then the clutch lever.

18. In combination with a rotary member; a shaft member; a movable key mounted in one of the members and adapted to engage the other member to form a rigid connection therebetween; means for positively moving the key in one direction; friction mechanism adapted to engage one of the members, comprising in part two arms, one end of one of which is held in a fixed position, and the end of the other arm is free; and means, as toggle mechanism, for applying pressure to the end of the last mentioned arm, and through it friction to the part with which the arms are engaged; yielding means for moving the toggle mechanism in one direction; and means for drawing the clutch lever out of the path of movement of the key during a portion of the operation of the toggle mechanism, the sequence of operations of the toggle mechanism being such that while moving in one direction, the friction mechansm is first applied and then the key moved so as to break the connection between the rotary and shaft members, and while the toggle mechanism is moving in the opposite direction the friction mechanism is first released and then the key is moved to such position that it forms a rigid connection between the rotary and the shaft members.

In testimony whereof, I have hereunto affixed my signature.

JESSE B. BURTON.